(12) United States Patent
Stenz et al.

(10) Patent No.: US 11,274,757 B2
(45) Date of Patent: *Mar. 15, 2022

(54) FUEL CAP WITH DUCKBILL VALVE

(71) Applicant: Kohler Co., Kohler, WI (US)

(72) Inventors: Gary Stenz, Mt. Calvary, WI (US); Mark Huibregtse, Elkhart Lake, WI (US); Brian Hartwig, New Holstein, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,262

(22) Filed: Apr. 17, 2020

(65) Prior Publication Data

US 2020/0240535 A1 Jul. 30, 2020

Related U.S. Application Data (63) Continuation of application No. 16/194,620, filed on Nov. 19, 2018, now Pat. No. 10,663,069.

(60) Provisional application No. 62/592,962, filed on Nov. 30, 2017.

(51) Int. Cl.
*F16K 15/14* (2006.01)
*B60K 15/05* (2006.01)

(52) U.S. Cl.
CPC ............ *F16K 15/147* (2013.01); *B60K 15/05* (2013.01)

(58) Field of Classification Search
CPC .............................. F16K 15/147; B60K 15/05
See application file for complete search history.

(56) References Cited

U.S. PATENT DOCUMENTS

| 4,028,075 | A |   | 6/1977  | Roberge |
|-----------|---|---|---------|---------|
| 4,846,836 | A |   | 7/1989  | Reich |
| 4,924,923 | A | * | 5/1990  | Boehmer .............. F16K 15/147 141/312 |
| 5,261,459 | A |   | 11/1993 | Atkinson |
| 5,649,639 | A |   | 7/1997  | Dolvet |
| 6,095,363 | A |   | 8/2000  | Harris et al. |
| 6,866,056 | B1 |  | 3/2005  | Scott |
| 7,159,741 | B2 |  | 1/2007  | Dehn et al. |

(Continued)

FOREIGN PATENT DOCUMENTS

| CN | 2924212 Y | 7/2007 |
| CN | 101078424 A | 11/2007 |

(Continued)

OTHER PUBLICATIONS

Chinese Office Action for Chinese Application No. 201811433047.1 dated Sep. 24, 2020.

(Continued)

*Primary Examiner* — P. Macade Nichols
(74) *Attorney, Agent, or Firm* — Lempia Summerfield Katz LLC (57) ABSTRACT

A valve member provides for the flow of vapors from a fuel tank of an internal combustion engine to escape the fuel tank. The valve member may include a valve and a boss or spacer. The valve is configured to selectively control the flow of vapor from the fuel tank. The boss or spacer is positioned in a predetermined relationship to the valve, and the boss or spacer prevents a deformation of the valve from disrupting the selectively controlled flow of vapor from the fuel tank.

20 Claims, 13 Drawing Sheets

(56) References Cited

U.S. PATENT DOCUMENTS

| | | |
|---|---|---|
| 7,261,093 B2 | 8/2007 | Groom et al. |
| 7,311,088 B1 | 12/2007 | Callahan et al. |
| 7,320,314 B2 | 1/2008 | Kashima et al. |
| 7,493,894 B2 | 2/2009 | Davis et al. |
| 7,610,905 B2 | 11/2009 | Callahan et al. |
| 7,677,277 B2 | 3/2010 | Thompson et al. |
| 7,703,629 B2 | 4/2010 | Nelson |
| 7,789,075 B2 | 9/2010 | Makino |
| 8,038,027 B2 | 10/2011 | Ohsawa et al. |
| 8,096,438 B2 | 1/2012 | Schmalz et al. |
| 8,408,415 B2 | 4/2013 | Schmalz et al. |
| 8,551,231 B2 | 10/2013 | Tanaka |
| 8,561,826 B2 | 10/2013 | Wang et al. |
| 8,567,628 B2 | 10/2013 | Dunkle et al. |
| 8,746,485 B1 | 6/2014 | Tiefenthaler |
| 8,915,234 B2 | 12/2014 | Gulke et al. |
| 9,096,124 B2 | 8/2015 | Whelan et al. |
| 9,193,260 B2 | 11/2015 | Sotiriades et al. |
| 9,365,109 B2 | 6/2016 | Bork |
| 9,492,779 B2 | 11/2016 | Yi |
| 9,611,819 B2 | 4/2017 | Yi |
| 9,669,707 B2 | 6/2017 | Yi |
| 9,732,649 B2 | 8/2017 | Hiltzik et al. |
| 9,737,843 B2 | 8/2017 | Chou et al. |
| 9,770,977 B2 | 9/2017 | Yi |
| 9,809,112 B2 | 11/2017 | Yi |
| 9,976,661 B2 | 5/2018 | Yi |
| 10,052,946 B2 | 8/2018 | Sotiriades et al. |
| 10,663,069 B2 * | 5/2020 | Stenz ................ F16K 15/147 |
| 2003/0234254 A1 | 12/2003 | Grybush et al. |
| 2004/0094554 A1 | 5/2004 | Grybush et al. |
| 2007/0125784 A1 | 6/2007 | Bisceglia et al. |
| 2007/0175514 A1 | 8/2007 | Tharp et al. |
| 2007/0261679 A1 | 11/2007 | Tschantz |
| 2008/0041682 A1 | 2/2008 | De |
| 2008/0251053 A1 | 10/2008 | Shears et al. |
| 2008/0251055 A1 | 10/2008 | Schmalz et al. |
| 2008/0251138 A1 | 10/2008 | Wang et al. |
| 2011/0168715 A1 | 7/2011 | Erdmann et al. |
| 2013/0341331 A1 | 12/2013 | Bork |
| 2015/0040765 A1 | 2/2015 | Zastera et al. |
| 2016/0068060 A1 | 3/2016 | Sotiriades et al. |
| 2016/0091077 A1 | 3/2016 | Sotani et al. |
| 2016/0256814 A1 | 9/2016 | Bork |
| 2017/0304765 A1 | 10/2017 | Chou et al. |
| 2018/0118019 A1 | 5/2018 | Zhang |

FOREIGN PATENT DOCUMENTS

| | | |
|---|---|---|
| CN | 101232927 A | 7/2008 |
| CN | 201395047 Y | 2/2010 |
| CN | 202381203 U | 8/2012 |
| CN | 103640466 A | 3/2014 |
| CN | 104190488 A | 12/2014 |
| CN | 104385908 A | 3/2015 |
| CN | 104389705 A | 3/2015 |
| CN | 104481761 A | 4/2015 |
| CN | 204267183 U | 4/2015 |
| CN | 106704059 A | 5/2017 |
| CN | 107143440 A | 9/2017 |
| CN | 206816419 U | 12/2017 |
| CN | 109253290 A | 1/2019 |
| CN | 209557139 U | 10/2019 |
| CN | 209908589 U | 1/2020 |
| JP | S5874662 U | 5/1983 |
| JP | 2000205073 A | 7/2000 |
| KR | 20100002379 A | 1/2010 |
| KR | 20100002387 A | 1/2010 |
| WO | WO2009111967 A1 | 9/2009 |

OTHER PUBLICATIONS

Chinese Office Action for Chinese Application No. 201910074444.2 dated Apr. 13, 2021, with English summary.

Chinese Office Action for Chinese Application No. 201811433047.1 dated May 11, 2021.

* cited by examiner

FUEL CAP WITH DUCKBILL VALVE

CROSS REFERENCE TO RELATED APPLICATION

This application is a continuation under 35 U.S.C § 120 and 37 C.F.R. § 1.53(b) of U.S. patent application Ser. No. 16/194,620 filed Nov. 19, 2018, each of which claims the benefit of U.S. Provisional Application Ser. No. 62/592,962 filed Nov. 30, 2017, and each of which is hereby incorporated by reference in its entirety.

FIELD

This disclosure relates in general to a fuel cap for an internal combustion engine, and more specifically, to apparatus and techniques for regulation of evaporative emissions using the fuel cap.

BACKGROUND

A fuel tank for an internal combustion engine encloses and stores combustible fuel. The fuel may include hydrocarbons. The fuel naturally evaporates into the atmosphere. When hydrocarbons evaporate and escape to the atmosphere, the hydrocarbons may become pollutants. Evaporation rates may be increased by heat from warm weather. Evaporation levels may accumulate over time for engines that often spend long periods of time between starts and/or spend long periods in non-climate controlled environments such as garages. Evaporation is also caused from heat from the operation of the engine.

A fuel cap may vent pressurized fuel vapor out of the fuel tank into one or more filters for removing hydrocarbons. High pressure in the fuel tank may affect the venting of the pressurized vapor. Challenges remain in venting of evaporative fuel vapors from the fuel tank.

BRIEF DESCRIPTION OF THE DRAWINGS

Exemplary embodiments are described herein with reference to the following drawings.

DETAILED DESCRIPTION

Figure 1:
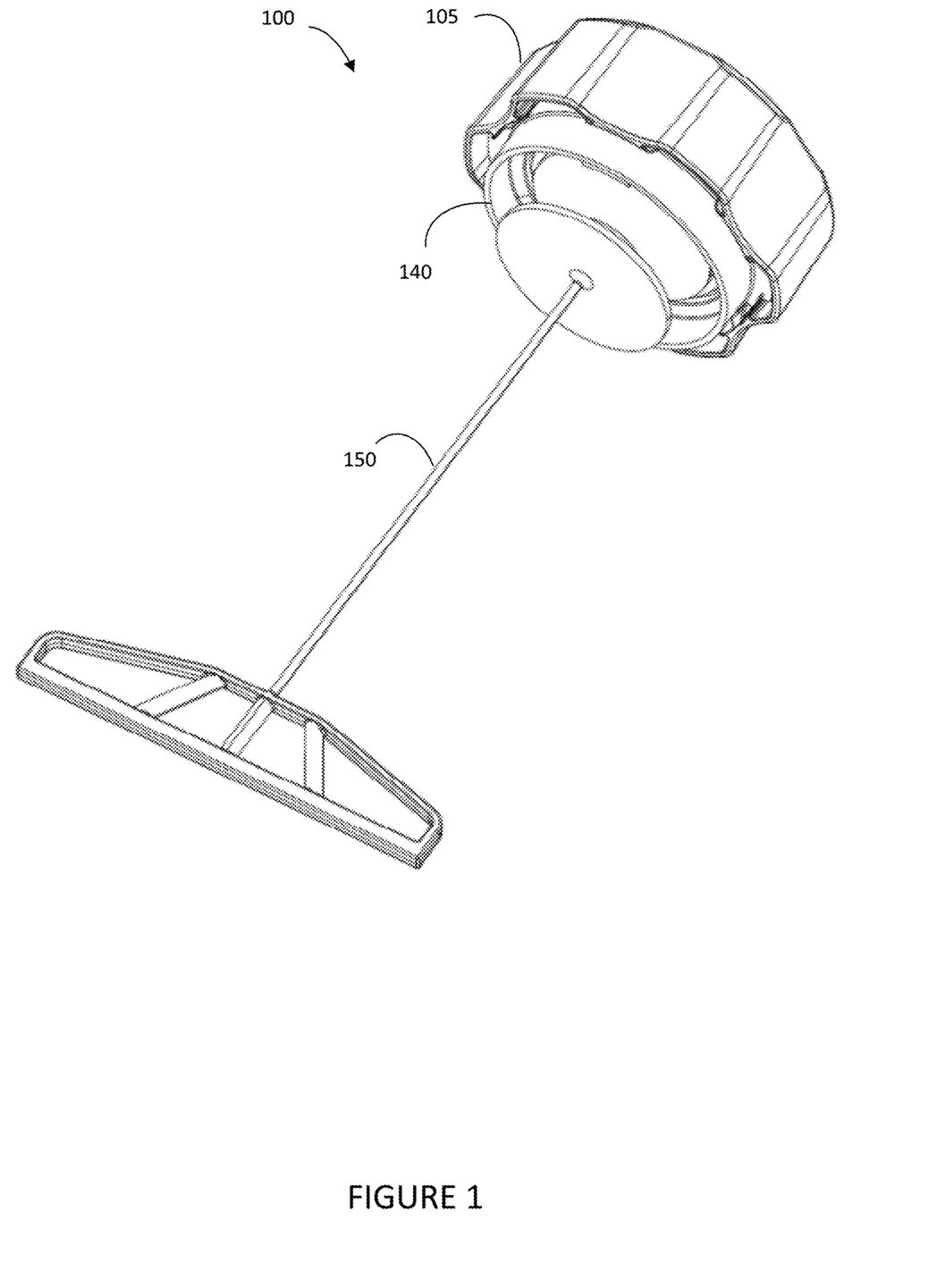
FIG. 1 illustrates a fuel cap.

FIG. 1 illustrates a fuel cap 100, which may include at least an outer shell or cover 105, an internal sleeve 140, and a tether 150. The internal sleeve 140 may couple internal components of the fuel cap 100 together. The internal sleeve 140 may include a threading or another coupling mechanism to secure the fuel cap 100 to a fuel port of an engine. The tether 150 includes an extended member, which may be formed of plastic and may be flexible or rigid, that connects the fuel cap 100 to an anchor. The anchor is sized larger than the largest dimension of the fuel port of the engine to prevent the fuel cap 100 from becoming detached from the engine at a distance greater than the length of the extended member.

The engine may be a small internal combustion engine applicable to chainsaws, lawn mowers, wood chippers, stump grinders, concrete trowels, mini excavators, concrete saws, portable saw mills, weed trimmers, all-terrain vehicles, wood splitters, pressure washers, garden tillers, tractors, plows, snow blowers, welding equipment, generators, and other devices. Often such small engine containing devices are used in close proximity to a user (e.g., a human). It is desirable to reduce or minimize the amount of hydrocarbon evaporative emissions from these types of devices. The fuel cap 100 includes an evaporative emission reduction device for reducing the leakage or escape of emissions from the fuel tank of the engine.

Figure 2A:
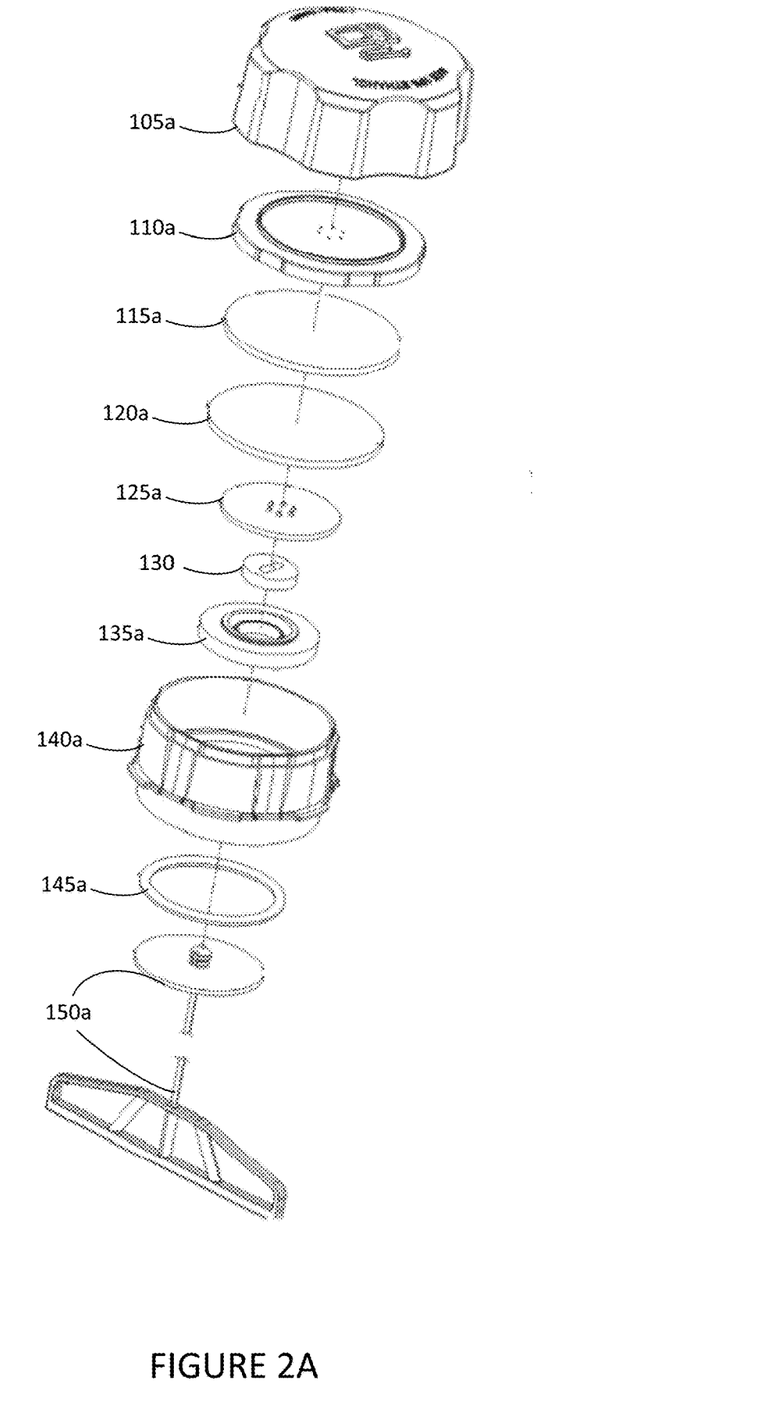
FIG. 2A illustrates an example exploded view of the fuel cap of FIG. 1.
Figure 2B:
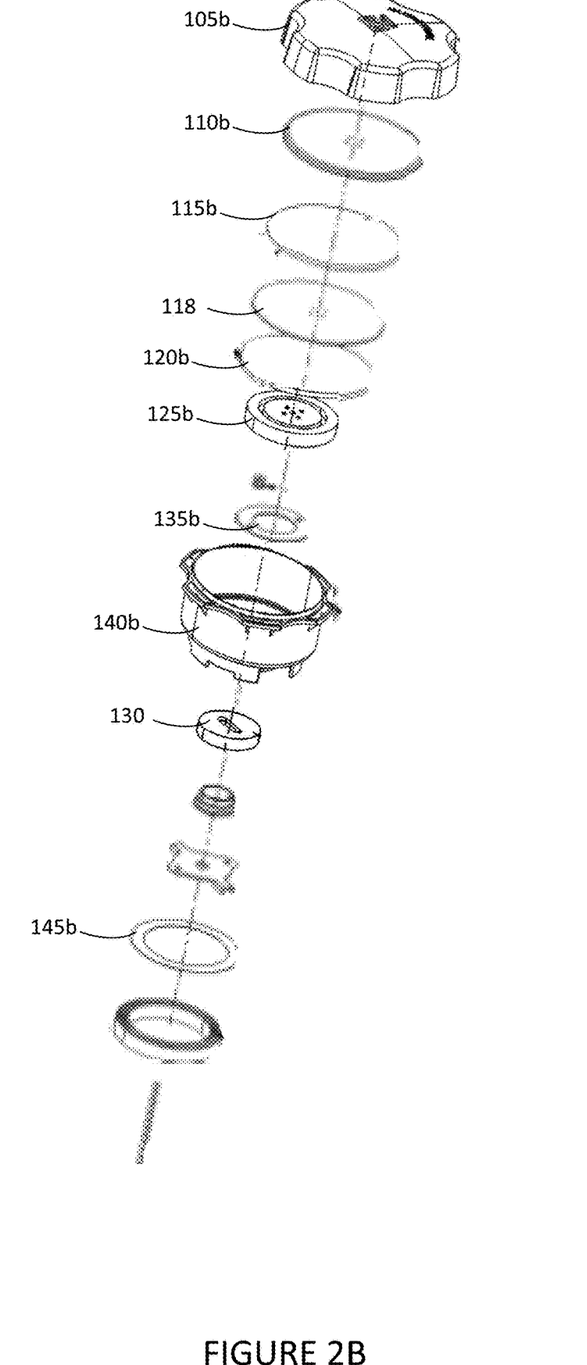
FIG. 2B illustrates another example exploded view of the fuel cap of FIG. 1.

FIG. 2A illustrates an exploded view of the fuel cap 105 of FIG. 1 including the evaporative emission reduction device. In addition to the components discussed with respect to FIG. 1, the fuel cap 105a includes an upper filter retainer 110a, a lower filter retainer 125a, a duck bill valve 130, a valve support 135a, and a seal 145a. The upper filter retainer 110a and the lower filter retainer 125a support an upper filter 115*a* and a lower filter 120*a*. Various materials such as molded plastic may be used for the internal sleeve 140*a*, the tether 150*a*, the upper filter retainer 110*a*, the lower filter retainer 125*a*, the valve support 135*a*, and the seal 145*a*. Additional, different, or fewer components may be included. FIG. 2B illustrates an example exploded view of the fuel cap of FIG. 1 using similar components that vary in structure from the example of FIG. 2A including a fuel cap 105*b*, an upper filter retainer 110*b*, a lower filter retainer 125*b*, a duck bill valve 130, a valve support 135*b*, an internal sleeve 140*b*, and a seal 145*b*. The upper filter retainer 110*b* and the lower filter retainer 125*b* support an upper filter 115*a*, a middle filter 118, and a lower filter 120*a*.

Figure 3:
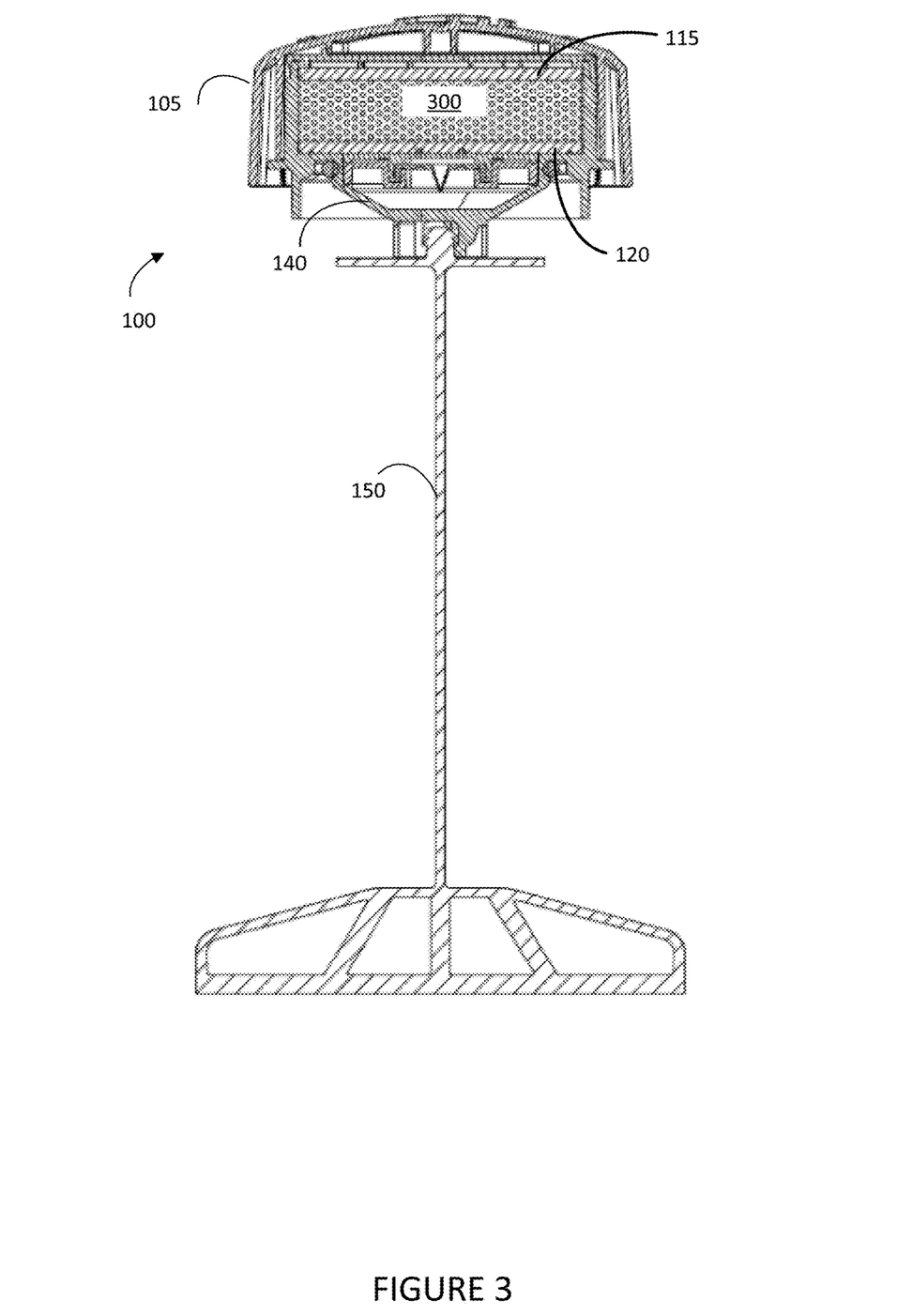
FIG. 3 illustrates a cross sectional view of the fuel cap of FIG. 1.

FIG. 3 illustrates a cross sectional view of the fuel cap of FIG. 1. Between the upper filter 115 and the lower filter 120 may be a hydrocarbon filter 300 that removes hydrocarbon material from the vapor released from the fuel tank. The hydrocarbon filter may adsorb hydrocarbons from the vapor. The hydrocarbon filter 300 may include adsorption capsules. Vapor entering the hydrocarbon filter may be hydrocarbon evaporative emission and the flow leaving the hydrocarbon filter may be considered scrubbed vapor or air. The scrubbed air may be safe for release into the atmosphere according to one or more guidelines or regulations. The upper filter 115, the lower filter 120, or both may be formed from a felt or another type of fabric. Example types of fabric include a compounding non-spinning fabric. The combination of the upper filter 115 the lower filter 120 may be referred to as a dilayer compounding non-spinning fabric. In one example, three layers (e.g., upper filter 115*a*, middle filter 118, and lower filter 120*a*) form a trilayer fabric.

Figure 4A:
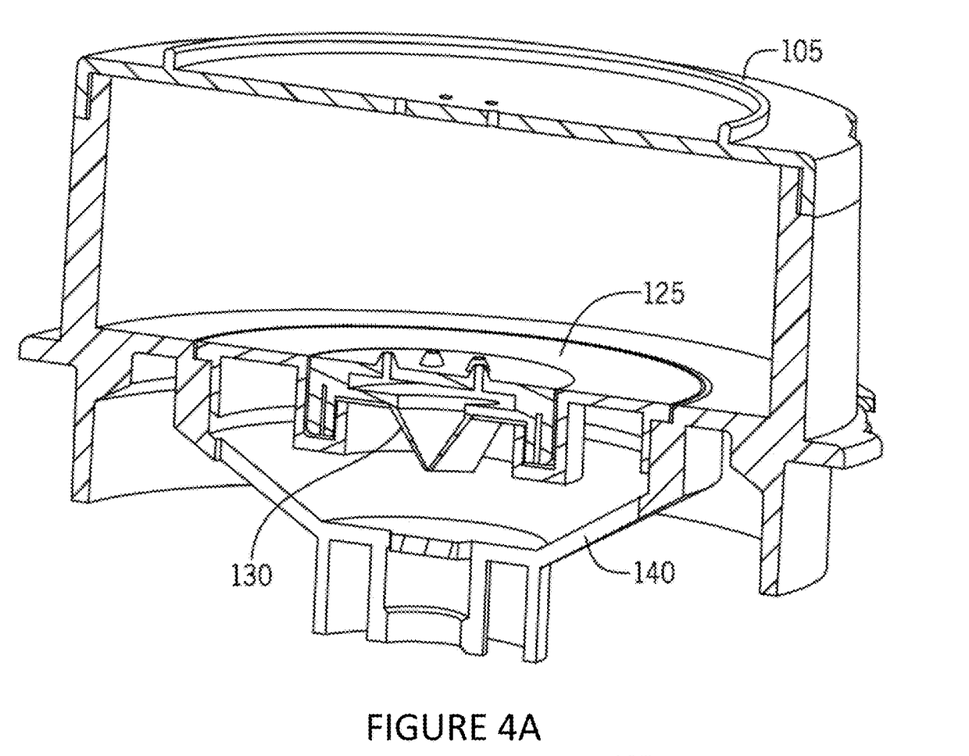
FIG. 4A illustrates a more detailed view of the fuel cap of FIG. 1 including a duckbill valve.
Figure 4B:
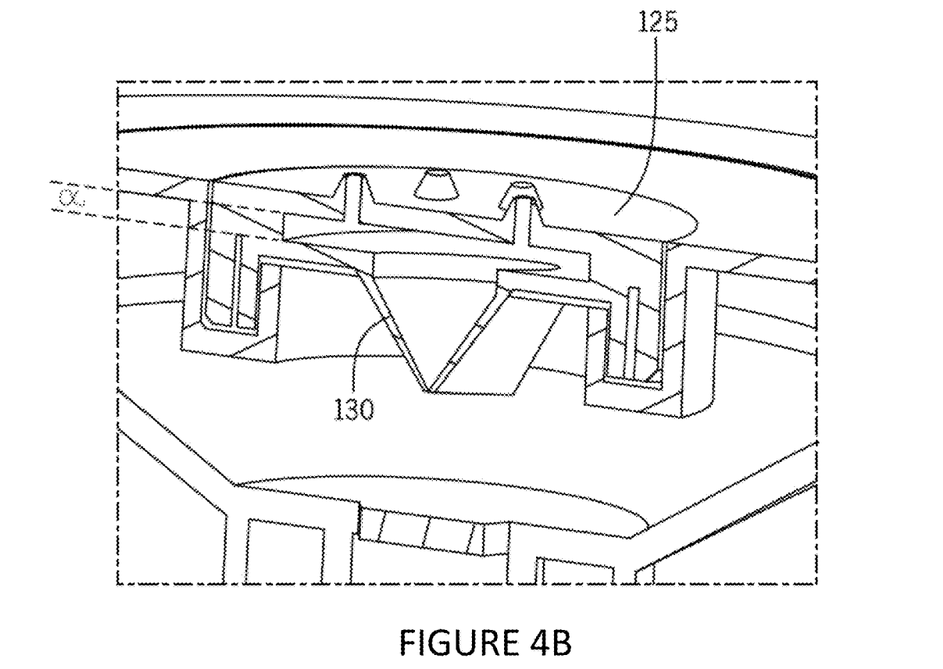
FIG. 4B illustrates the duckbill valve of FIG. 4A.

FIG. 4A illustrates a more detailed view of the fuel cap of FIG. 1 including a duckbill valve 130. FIG. 4B illustrates the duckbill valve 130 of FIG. 4A. The duck bill valve 130 may include multiple valves. The valves may include one or more one-way valve and/or one or more check valve. The valves allow air flow or pressure to flow in one direction through the duckbill valve 130 and not in another direction through the duckbill valve 130.

Figure 5A:
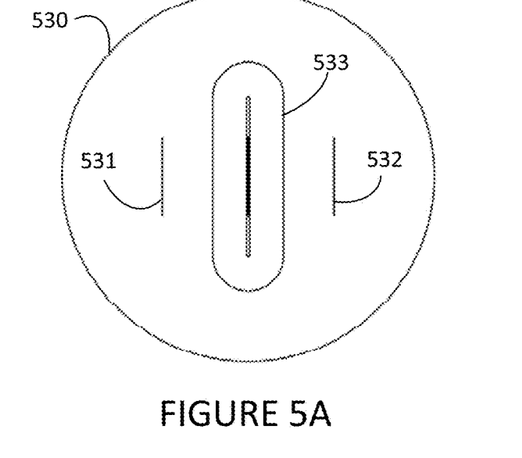
FIGS. 5A and 5B illustrate views of the top of the duckbill valve.
Figure 5B:
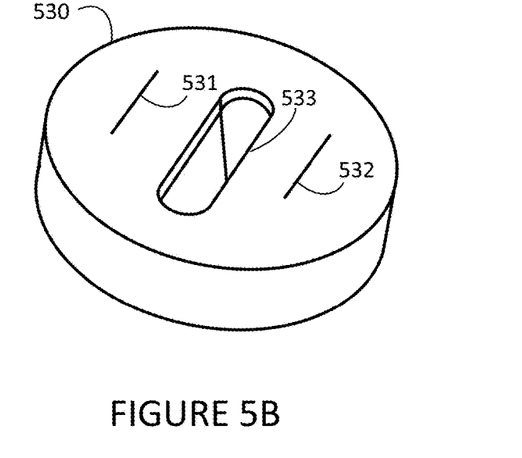

FIGS. 5A and 5B illustrate views of the top of a duckbill valve member 530 including a major valve 533 and multiple minor valves (e.g., minor valve 531 and 532). The major valve 533 may allow air flow in a first direction (e.g., into the fuel tank from the atmosphere or elsewhere in the vicinity of the engine) and the minor valves 531 and 532 may allow air flow in a second direction (e.g., out of the fuel tank to the atmosphere or elsewhere in the vicinity of the engine). The valves may have any size, orientation, and direction. The terms minor and major do not necessarily represent relative size or flow volumes for the valves.

Figure 5C:
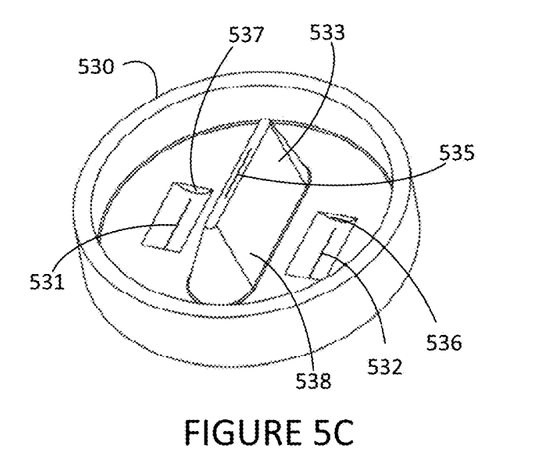
FIGS. 5C and 5D illustrate views of the bottom of the duckbill valve.
Figure 5D:
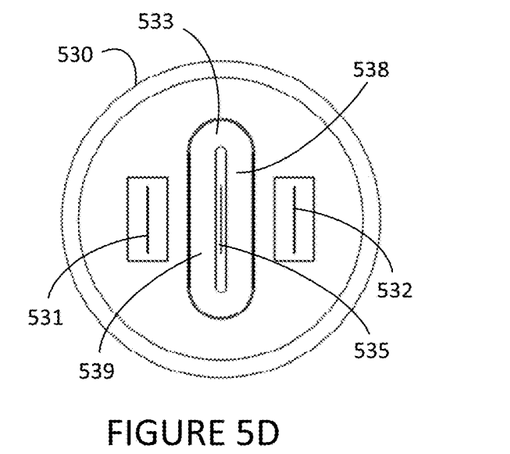
Figure 5E:
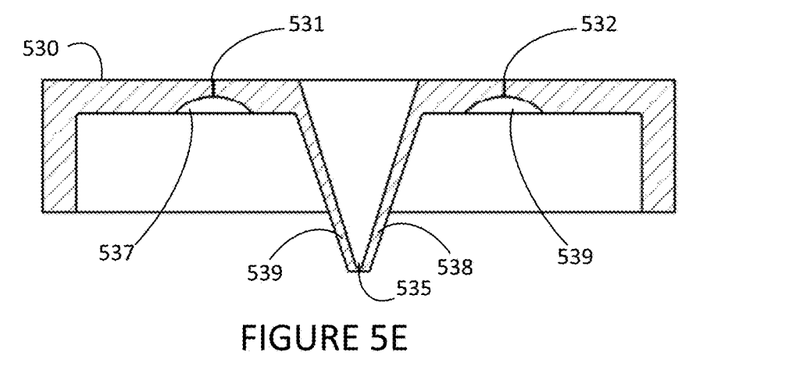
FIG. 5E illustrates a cross sectional side view of the duckbill valve.

FIGS. 5C and 5D illustrate views of the bottom of the duckbill valve member 530 and FIG. 5E illustrates a cross sectional side view of the duckbill valve, illustrating that the major valve 533 extends in a duck bill shape or a triangular prism shape away from the base of the duckbill valve member 530 towards the interior of the fuel tank. The major valve 533 includes a first angled portion 538 and a second angled portion 539 that terminate at opening 535. The minor valves 531 and 532 each include a domed shaped cavity for openings 536 and 537, respectively, that is concave in a direction opposite that of the extension of the major valve 533. Thus, the major valve 533 and the minor valves 531 and 532 operate as one-way or check valves in opposite directions.

When air or vapor pressure inside the fuel tank of the engine exceeds a threshold, a force is applied to the domed shaped cavities for openings 536 and 537. The force causes the openings 537 and 537 to allow air or vapor flow from the fuel tank and into the fuel cap including the emission filter. When the pressure inside the fuel tank of the engine exceeds a second threshold, the force may cause the duckbill valve member 530 to deform or otherwise change shape. Some of the deformation allows the duckbill valve member 530 to operate properly. However, when the duckbill valve member 530 becomes too deformed it may contact an adjacent member (e.g., lower filter retainer 125). Contact with the adjacent member may disrupt the valve operation and restrict the flow of air out of the fuel tank.

FIG. 4B illustration a distance a between the adjacent member (e.g., lower filter retainer 125) and the duckbill valve member 530. When the distance a falls below a spacing threshold because the duckbill valve member 530 has become too deformed, the duckbill valve member 530 does not operate properly.

The following embodiments include apparatus and techniques for preventing this disruption of the valve operation and/or maintaining at least the distance $\alpha$ between the adjacent member (e.g., lower filter retainer 125) and the duckbill valve member.

Figure 6A:
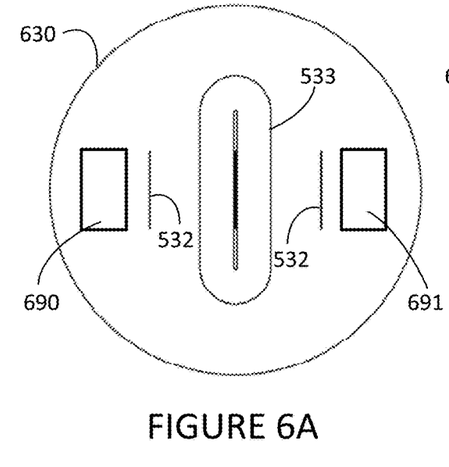
FIGS. 6A and 6B illustrate views of the top of the duckbill valve with outwardly arranged bosses.
Figure 6B:
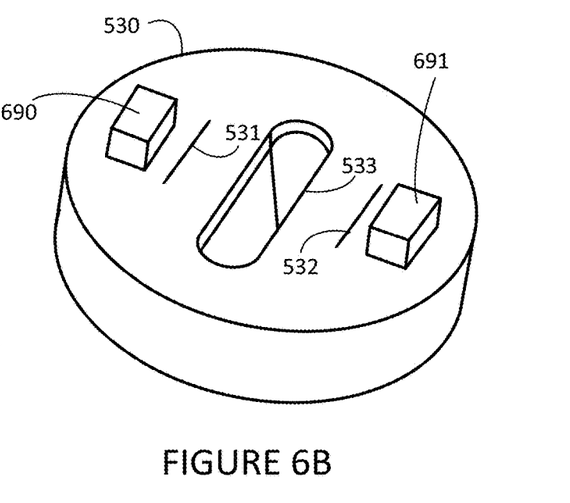
Figure 6C:
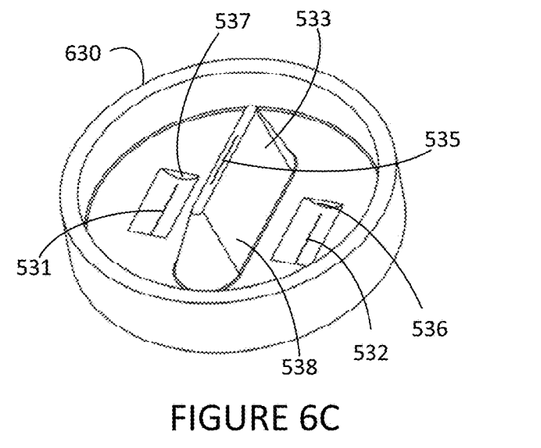
FIGS. 6C and 6D illustrate views of the bottom of the duckbill valve with outwardly arranged bosses.
Figure 6D:
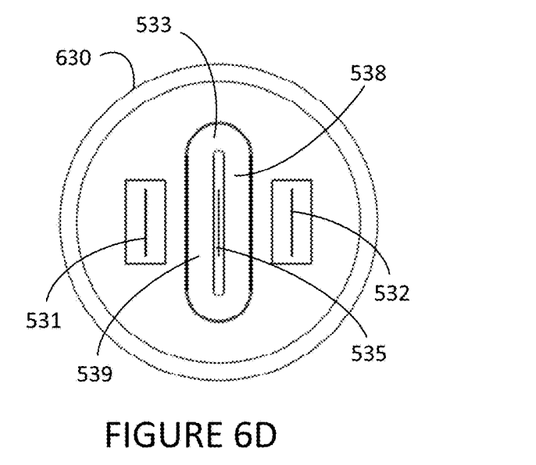
Figure 6E:
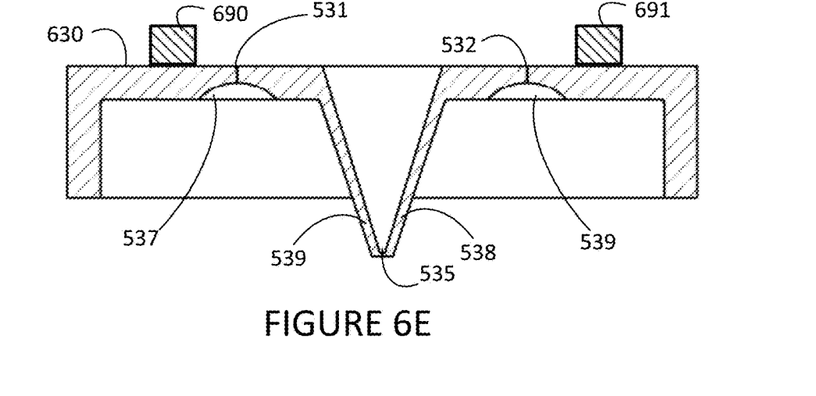
FIG. 6E illustrates a cross sectional side view of the duckbill valve with outwardly arranged bosses.

FIGS. 6A and 6B illustrate views of the top of the duckbill valve member 630 with outwardly arranged bosses 690 and 691. FIGS. 6C and 6D illustrate views of the bottom of the duckbill valve 630 with outwardly arranged bosses 690 and 691. FIG. 6E illustrates a cross sectional side view of the duckbill valve 630 with outwardly arranged bosses 690 and 691.

The bosses 690 and 691 press against or near the adjacent member (e.g., lower filter retainer 125). The bosses 690 and 691 prevent or reduce deformation to the duckbill valve member 630. Therefore, the duckbill valve member 630 can operate under higher pressures in the fuel tank without reduction of the flow of air through the minor valves 531 and 532.

The bosses 690 and 691 may be made of the same material as the duckbill valve member 630 (e.g., rubber, elastomer, silicone or hydrocarbon-resistant fluorosilicone rubber). The bosses 690 and 691 may be positioned at a predetermined distance (e.g., 1 mm) from minor valves 531 and 532 in a direction of the circumference of the duckbill valve member 630. The bosses 690 and 691 may be formed integrally with the duckbill valve member 630. In one example, the bosses 690 and 691 may be dimples pressed into the duckbill valve member 630 from the opposite side.

Some arrangements may include different numbers of bosses (e.g., one, three, five, or another number). The bosses may be spaced at different distances from the major valve 533 or minor valves 531 and 531. The bosses may be spaced from the circumference of the duckbill valve member 630. The bosses may be another shape such as circular, triangular, or oval. The sides of the spacer rings may be sloped. The bosses may be arranged in a line in a direction perpendicular to a face of the bosses. Alternatively, the bosses may be arranged at different angles with respect to the major valve 533, minor valves 531 and 531, or the circumference of the duckbill valve member 630. The bosses 690 and 691, or other bosses described herein, may be sized at 1 mm cubed, 1 mm by 2 mm by 1 mm, or another size. One of the bosses may be one size and another of the bosses may be a different size. Any of these variations may be applied to bosses 690 and 691 as well as other embodiments herein.

Figure 7A:
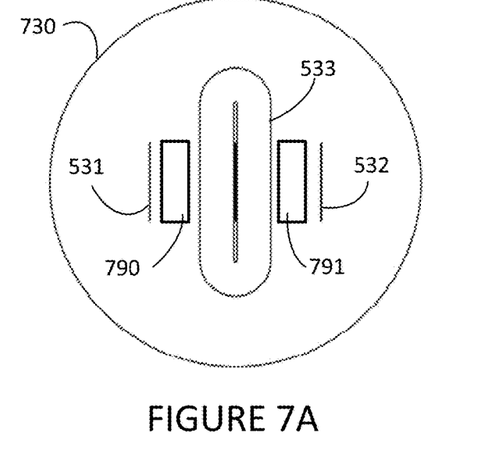
FIGS. 7A and 7B illustrate views of the top of the duckbill valve with inwardly arranged bosses.
Figure 7B:
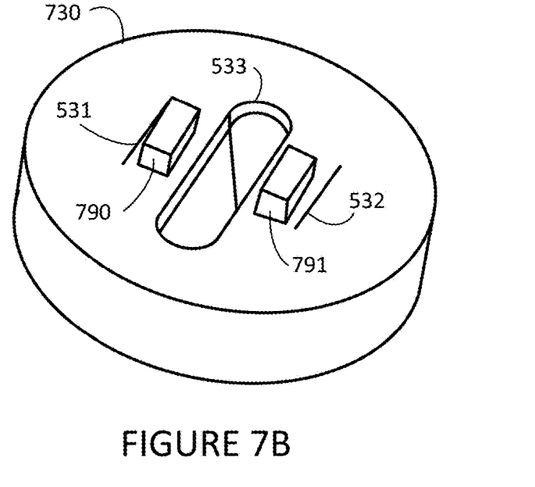
Figure 7C:
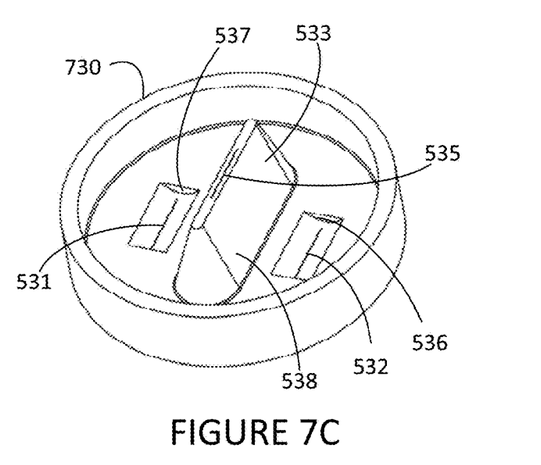
FIGS. 7C and 7D illustrate views of the bottom of the duckbill valve with inwardly arranged bosses.
Figure 7D:
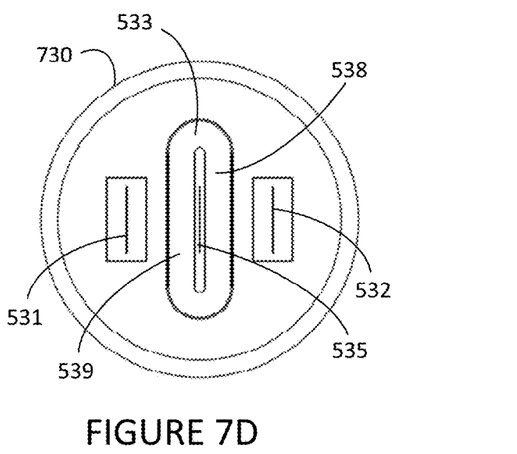
Figure 7E:
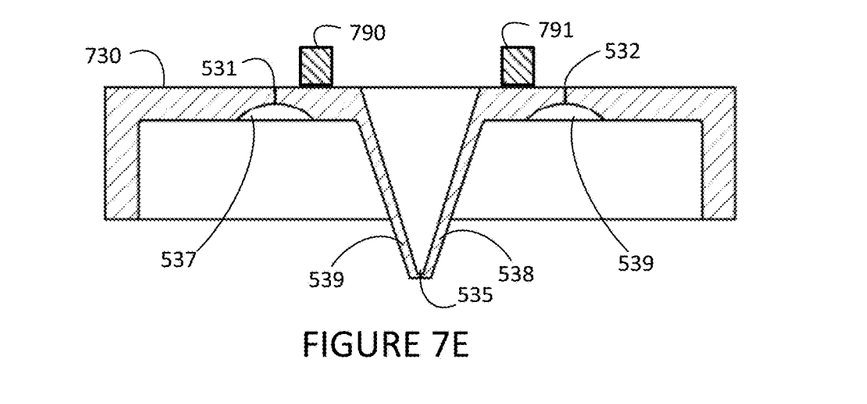
FIG. 7E illustrates a cross sectional side view of the duckbill valve with inwardly arranged bosses.

FIGS. 7A and 7B illustrate views of the top of the duckbill valve 730 with inwardly arranged bosses 790 and 791. FIGS. 7C and 7D illustrate views of the bottom of the duckbill valve 730 with inwardly arranged bosses 790 and 791. FIG. 7E illustrates a cross sectional side view of the duckbill valve 730 with inwardly arranged bosses 790 and 791.

The bosses 790 and 791 press against or near the adjacent member (e.g., lower filter retainer 125). The bosses 790 and 791 prevent or reduce deformation to the duckbill valve member 730. Therefore, the duckbill valve member 730 can operate under higher pressures in the fuel tank without reduction of the flow of air through the minor valves 531 and 532.

The bosses 790 and 791 may be made of the same material as the duckbill valve member 730 (e.g., rubber, elastomer, silicone or hydrocarbon-resistant fluorosilicone rubber). The bosses 790 and 791 may be positioned at a predetermined distance (e.g., 1 mm) from minor valves 531 and 532 in a direction toward the center of the duckbill valve member 630. The bosses 790 and 791 may be positioned at a predetermined distance (e.g., 0.1 mm) from major valve 533 in a direction toward the circumference of the duckbill valve member 630. Variations in shapes, sizes, quantity, and arrangement of bosses 790 and 791 may be made and examples of such variations are described in other embodiments herein.

Figures 8A, 8B:
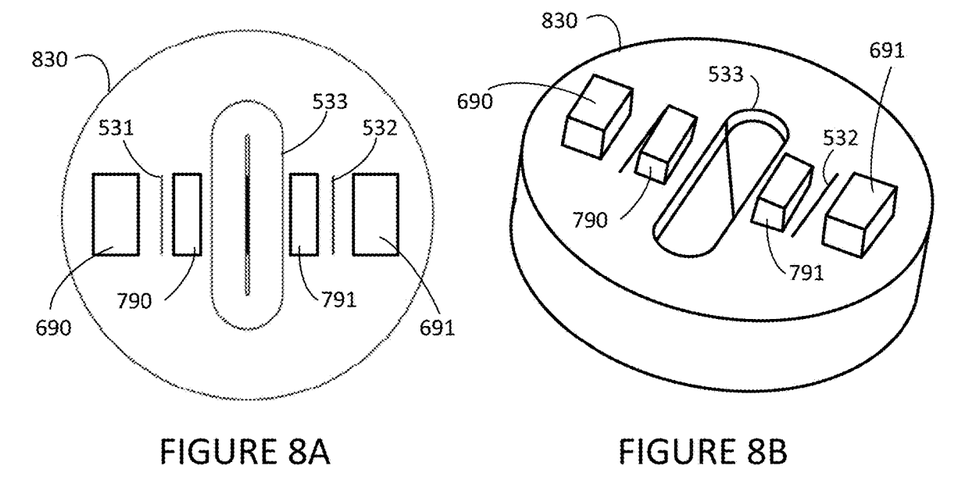
FIGS. 8A and 8B illustrate views of the top of the duckbill valve with both outwardly and inwardly arranged bosses.
Figure 8C:
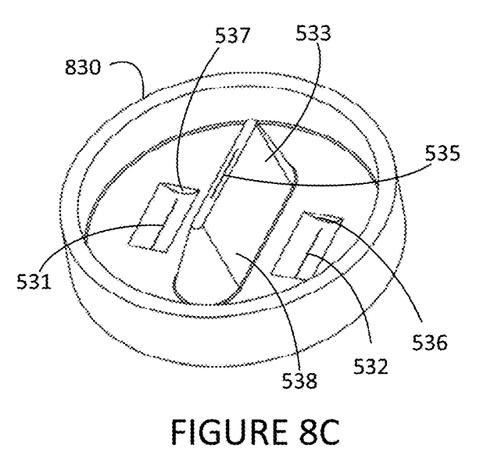
FIGS. 8C and 8D illustrate views of the bottom of the duckbill valve with both outwardly and inwardly arranged bosses.
Figure 8D:
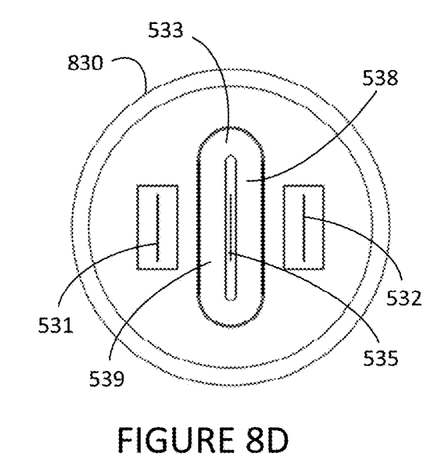
Figure 8E:
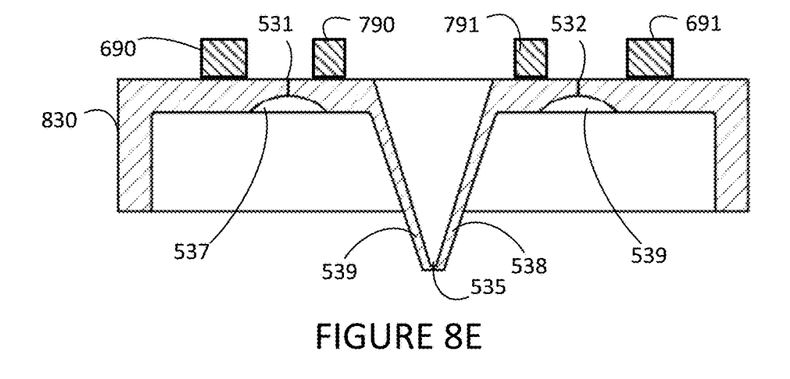
FIG. 8E illustrates a cross sectional side view of the duckbill valve with both outwardly and inwardly arranged bosses.

FIGS. 8A and 8B illustrate views of the top of the duckbill valve 830 with both outwardly arranged bosses 690 and 691 and inwardly arranged bosses 790 and 791. FIGS. 8C and 8D illustrate views of the bottom of the duckbill valve 830 with outwardly arranged bosses 690 and 691 and inwardly arranged bosses 790 and 791. FIG. 8E illustrates a cross sectional side view of the duckbill valve 830 with both outwardly arranged bosses 690 and 691 and inwardly arranged bosses 790 and 791. Variations in shapes, sizes, quantity, and arrangement of bosses 690, 691, 790 and 791 may be made and examples of such variations are described in other embodiments herein.

Figure 9A:
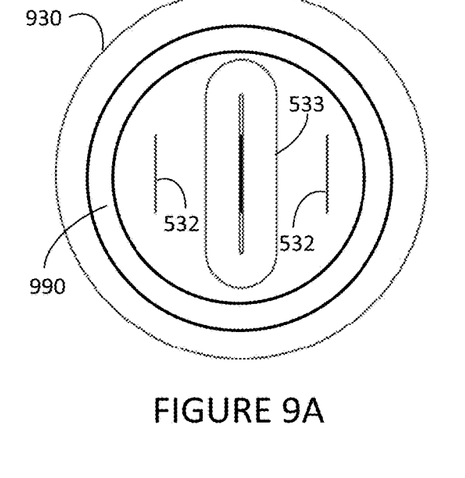
FIGS. 9A and 9B illustrate views of the top of the duckbill valve with a large spacer ring.
Figure 9B:
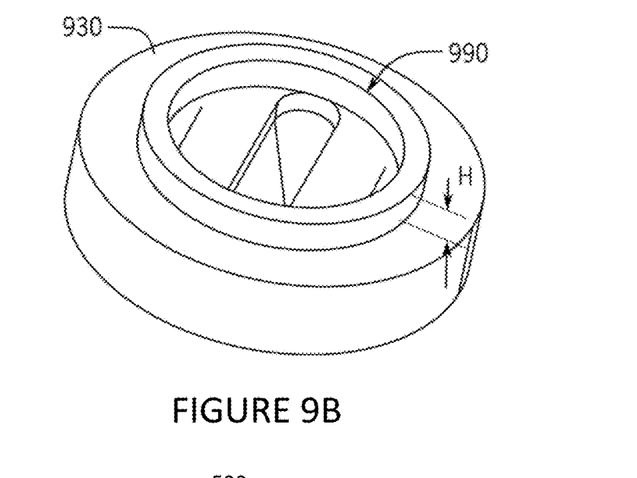
Figure 9C:
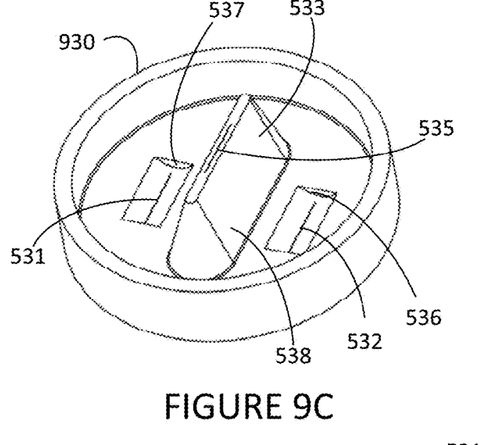
FIGS. 9C and 9D illustrate views of the bottom of the duckbill valve with the large spacer ring.
Figure 9D:
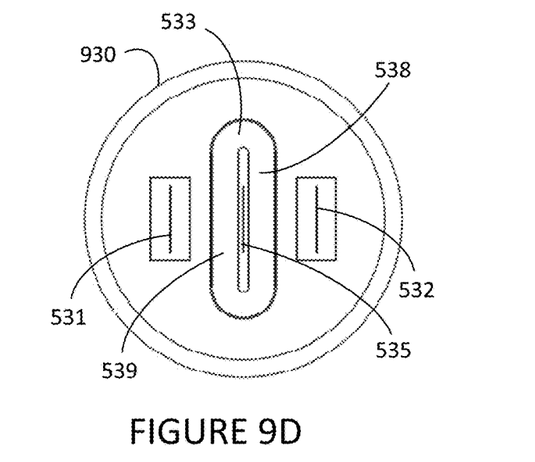
Figure 9E:
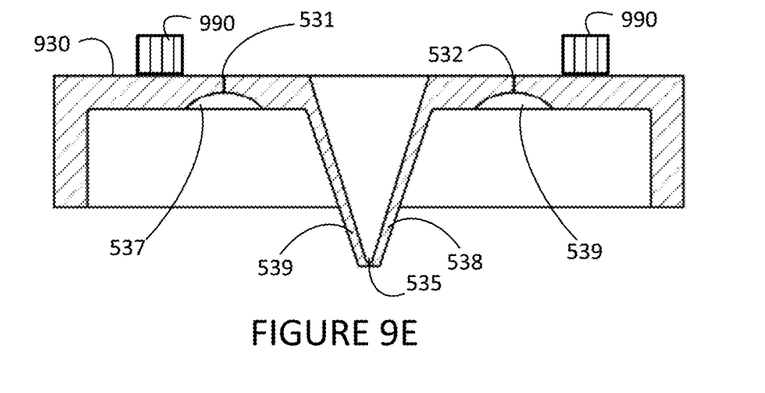
FIG. 9E illustrates a cross sectional side view of the duckbill valve with the large spacer ring.

FIGS. 9A and 9B illustrate views of the top of the duckbill valve 930 with a large spacer ring 990. FIGS. 9C and 9D illustrate views of the bottom of the duckbill valve 930 with the large spacer ring 990. FIG. 9E illustrates a cross sectional side view of the duckbill valve 930 with the large spacer ring 990. The large spacer ring 990 may have a diameter greater than a width of the major valve 533 and smaller than a dimeter of the duckbill valve 930. Examples for the diameter of the large spacer ring 990 may include 10 mm and 15 mm.

Figure 10A:
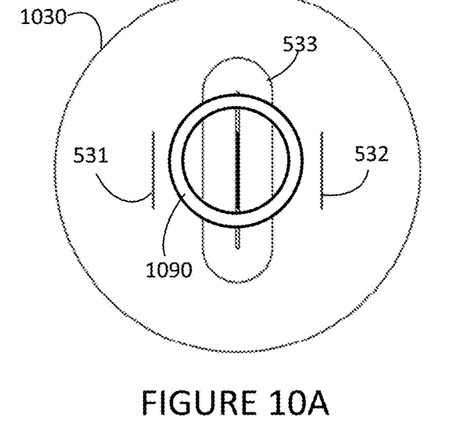
FIGS. 10A and 10B illustrate views of the top of the duckbill valve with a small spacer ring.
Figure 10B:
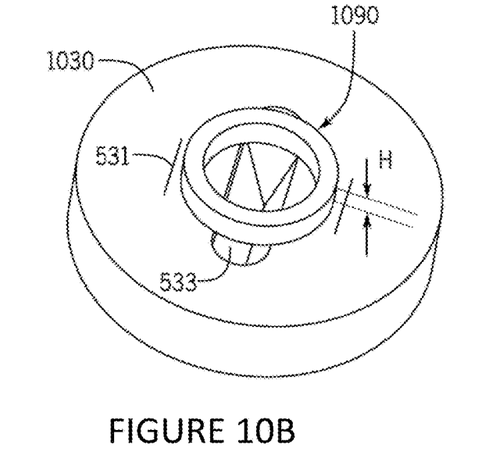
Figure 10C:
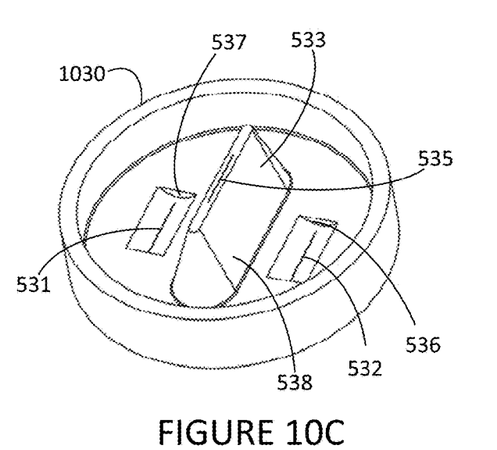
FIGS. 10C and 10D illustrate views of the bottom of the duckbill valve with the small spacer ring.
Figure 10D:
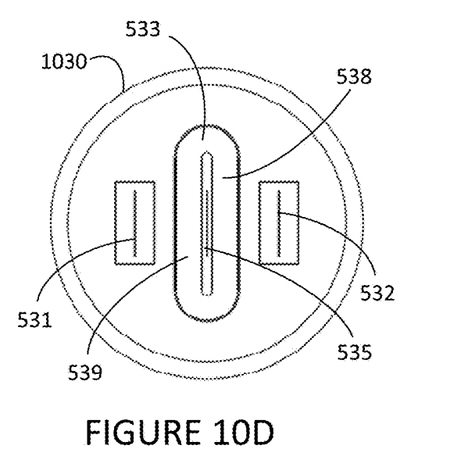
Figure 10E:
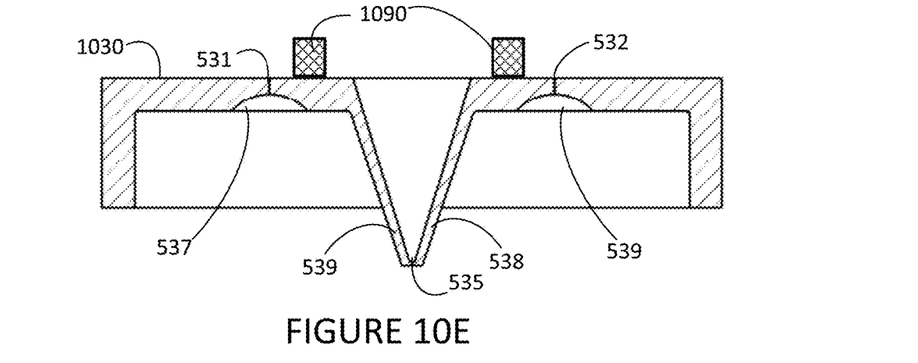
FIG. 10E illustrates a cross sectional side view of the duckbill valve with the small spacer ring.

FIGS. 10A and 10B illustrate views of the top of the duckbill valve 1030 with a small spacer ring 1090. FIGS. 10C and 10D illustrate views of the bottom of the duckbill valve 1030 with the small spacer ring 1090. FIG. 10E illustrates a cross sectional side view of the duckbill valve 1030 with the small spacer ring 1090. The small spacer ring 1090 may have a diameter smaller than a width of the major valve 533. The small spacer ring 1090 may have a diameter equal to or greater than a width of the minor valves 531 and 532. Examples for the small spacer ring 1090 may include 5 mm and 8 mm.

Figure 11A:
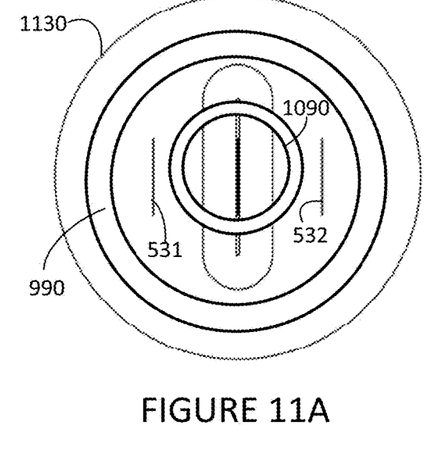
FIGS. 11A and 11B illustrate views of the top of the duckbill valve with the large and small spacer rings.
Figure 11B:
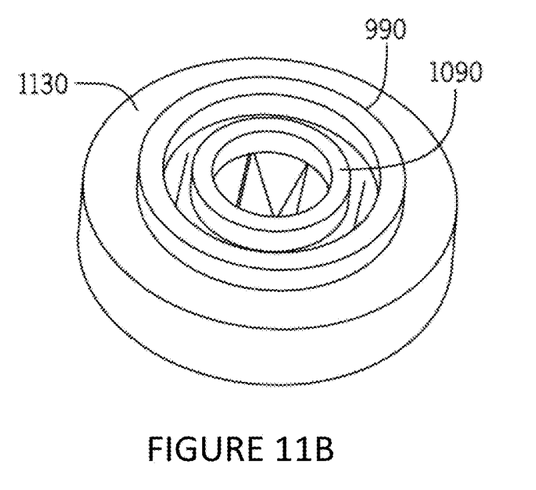
Figure 11C:
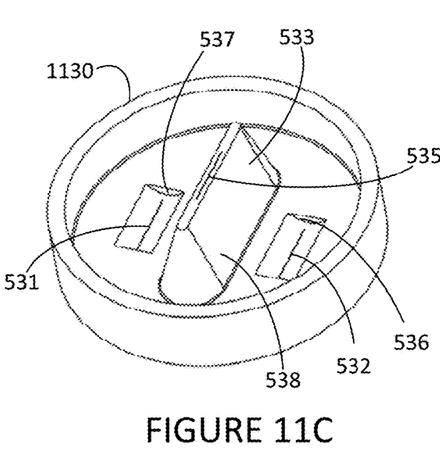
FIGS. 11C and 11D illustrate views of the bottom of the duckbill valve with the large and small spacer rings.
Figure 11D:
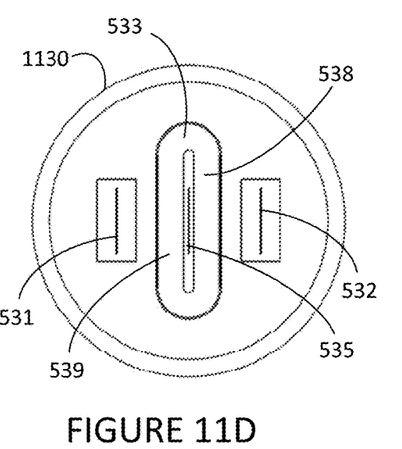
Figure 11E:
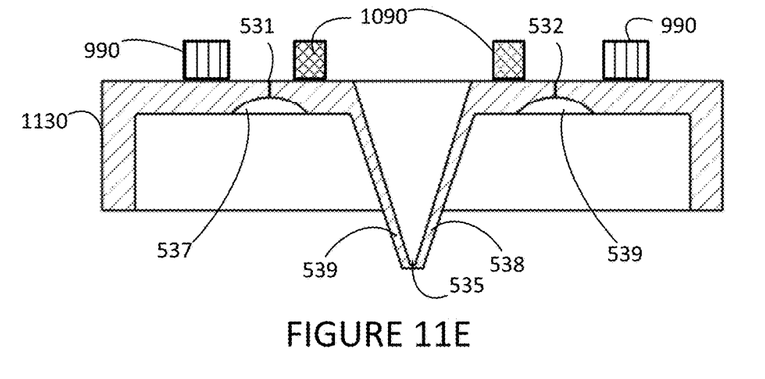
FIG. 11E illustrates a cross sectional side view of the duckbill valve with the large and small spacer rings.

FIGS. 11A and 11B illustrate views of the top of the duckbill valve 1130 with the large spacer ring 990 and the small spacer ring 1090. FIGS. 11C and 11D illustrate views of the bottom of the duckbill valve 1130 with the large spacer ring 990 and the small spacer ring 1090. FIG. 11E illustrates a cross sectional side view of the duckbill valve 1130 with the large spacer ring 990 and the small spacer ring 1090. A ratio between the diameter of the large spacer ring 990 and the small spacer ring 1090 may be in a range from 1.5 to 3. An example ratio is 2 such that the large spacer ring 990 is twice the width of the small spacer ring 1090.

Examples for the width and height (H) of the large spacer ring 990 and the small spacer ring 1090 may include 1 mm, 1.2 mm, 1.5 mm, and 2 mm. The spacer rings may have the same or different width or heights. The spacer rings may not be complete rings. In some examples, one or more of the spacer rings may be semi-circles or quarter-circles. The spacer rings may be another proportion of a complete circle such as 70% or 90%. The spacer rings may be discontinuous and formed of spaced portions (e.g., dashed circle shape). Other quantities of spacer rings may be used. The spacer rings may be concentric or arranged at different sides of the duckbill valve member. The spacer rings, rather than circular, may be square, rectangular or another shape. The sides of the spacer rings may be sloped.

Figure 12:
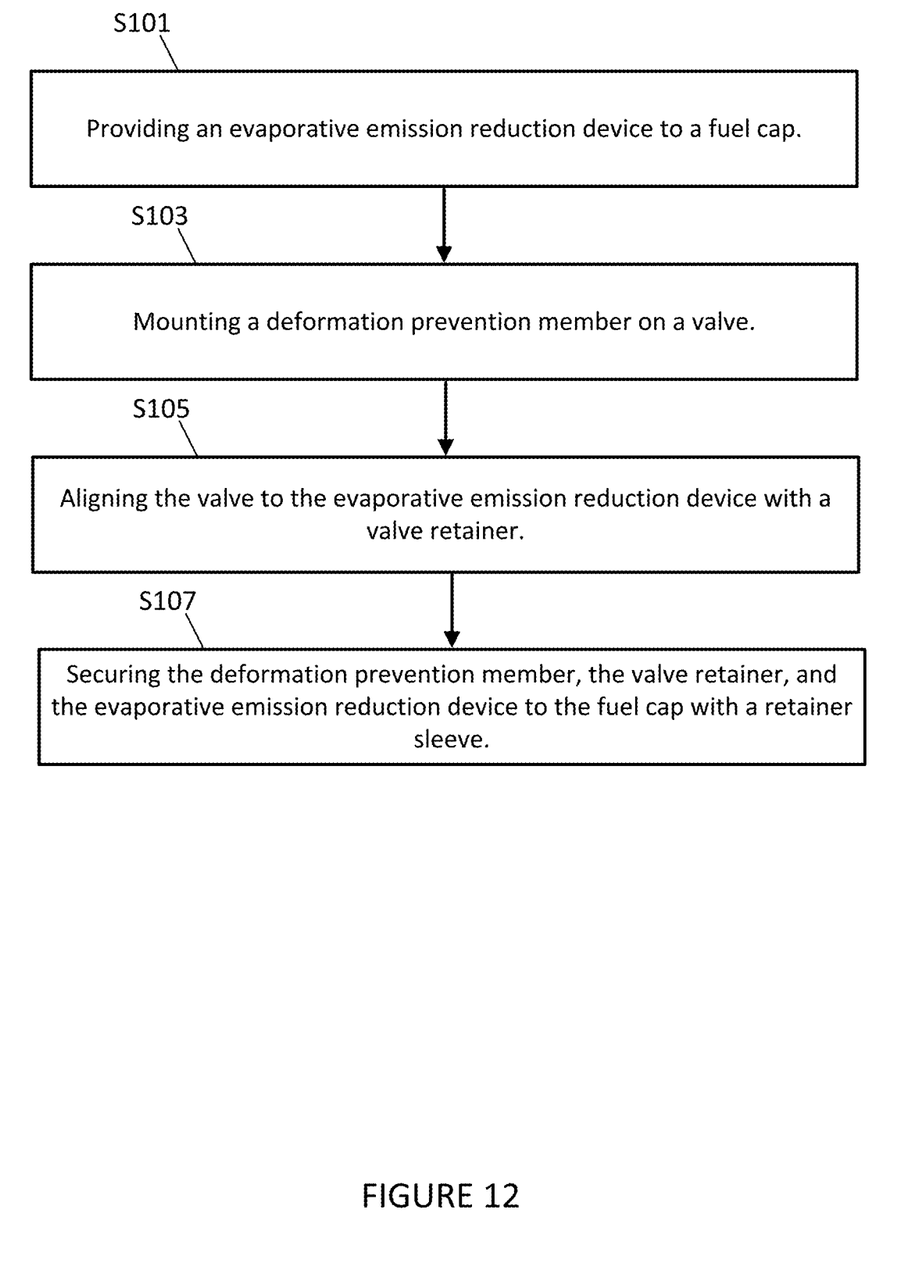
FIG. 12 illustrates a flowchart for manufacturing the fuel cap.

FIG. 12 illustrates an example flowchart for manufacturing a fuel cap including a duckbill filter or valve and an evaporative emission reduction device. Additional, different, or fewer acts may be included.

An act S101, an evaporative emission reduction device is provided to a fuel cap (e.g., fuel cap 100). The evaporative emission reduction device may include a hydrocarbon filter that adsorbs vapor or hydrocarbon material from the vapor released from the fuel tank. The evaporative emission reduction device reduces the escape of vapors from a fuel tank.

At act S103, a deformation prevention member is mounted on a valve member. The deformation prevention member may include one component, two components, or more than two components. The deformation prevention member may include at least one dimension (e.g., height) that meets or exceeds a deformation prevention threshold distance. The deformation prevention threshold distance may be selected according to the dimensions or materials of the valve member. Stiffer (e.g., with coefficient of elasticity below a predetermined value) valve members may have lower deformation prevention thresholds and require larger height for the deformation prevention member. More flexible (e.g., with coefficient of elasticity above a predetermined value) valve members may have higher deformation prevention thresholds and require smaller height for the deformation prevention member.

The deformation prevention member prevents the valve from become deformed, which may affect the control of the escape of vapors from the fuel tank. The valve member may be shaped in a disc that can twist or become contorted and prevent the valve opening from opening and closing in normal operation. The deformation may be caused by pressure above a predetermined pressure threshold in the fuel tank. The pressure threshold may depend on the size of the fuel tank, the shape of the fuel tank, the type of fuel in the fuel tank, the diameter of the fuel tank opening for the fuel tank, and/or the width and materials for the valve member. The deformation prevention member may be placed at a predetermined distance from the opening of the valve to protect the shape of the valve member and ensure that the valve opening open and closes in normal operation.

The deformation prevention member may be placed between the valve and an outer circumference of the valve member or between the valve in and a center of the valve member. The deformation prevention member may include two components include a first ring outside of the valve in a direction of an outer circumference of the valve member and a second ring that overlaps the valve.

At act S105, the valve member is aligned to the evaporative emission reduction device with a valve retainer. The valve retainer may include multiple layers such as the upper filter retainer 110a and the lower filter retainer 125a.

At act S107, the deformation prevention member, the valve retainer, and the evaporative emission reduction device are secured to the fuel cap with a retainer sleeve. The retainer sleeve may include an outer shell or cover 105, an internal sleeve 140, or a combination of shell 105 and internal sleeve 140.

In one implementation, the fuel cap may be anchored to the fuel cap or the engine including the fuel tank with a tether (e.g., tether 150). The tether may be shaped so that it cannot be removed from the fuel tank through the opening for the fuel tank. In another example, the tether is a cable or other coupling device that is secured to the fuel tank or the engine by a bolt, welding, rivet, or another fastening technique.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those skilled in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A valve member comprising:
   a valve configured to selectively control a flow of vapor from a fuel tank; and
   a boss positioned in a predetermined relationship to the valve,
   wherein the boss prevents a deformation of the valve from disrupting the selectively controlled flow of vapor from the fuel tank,
   wherein the boss is spaced from the valve in a direction of the center of the valve member.

2. The valve member of claim 1, wherein the boss is spaced from the valve in a direction of a circumference of the valve member.

3. The valve member of claim 1, wherein the valve is a first valve, the valve member further comprising:
   a second valve configured to selectively control a flow air into the fuel tank.

4. The valve member of claim 1, further comprising:
   a base connected to the valve and the boss, wherein the valve extends from the base in a first direction and the boss extends from the base in a second direction.

5. The valve member of claim 4, wherein the first direction is opposite the second direction.

6. A fuel cap comprising:
   an evaporative emission reduction device configured to reduce escape of vapors from a fuel tank;
   a valve configured to selectively control the escape of vapors from the fuel tank;
   a spacer positioned in a predetermined relationship to the valve, wherein the spacer prevents deformation in the valve; and
   a valve member shaped in a disc and comprising the valve,
   wherein the spacer is between an outer circumference of the valve member and a center of the valve member,
   wherein the spacer includes a first ring outside of the valve in a direction of an outer circumference of the valve member,
   wherein the spacer includes a second ring that overlaps the valve.

7. The fuel cap of claim 6, wherein the valve, if deformed, disrupts the selectively controlled escape of vapor from the fuel tank.

8. The fuel cap of claim 6, further comprising:
   a tether configured to anchor the fuel cap to the fuel tank or an engine including the fuel tank.

9. The fuel cap of claim 6, further comprising:
   a base connected to the valve and the spacer, wherein the valve extends from the base in a first direction and the spacer extends from the base in a second direction.

10. The fuel cap of claim 6, wherein the valve is a first valve, and the valve member includes a second valve configured to selectively control a flow air into the fuel tank.

11. A fuel cap comprising:
an evaporative emission reduction device configured to reduce escape of vapors from a fuel tank;
a valve configured to selectively control the escape of vapors from the fuel tank; and
a spacer positioned in a predetermined relationship to the valve,
wherein the spacer prevents deformation in the valve,
wherein the evaporative emission reduction device is an adsorption filter configured to adsorb vapors from the fuel tank.

12. The fuel cap of claim 11, wherein the valve, if deformed, disrupts the selectively controlled escape of vapor from the fuel tank.

13. The fuel cap of claim 11, further comprising:
a tether configured to anchor the fuel cap to the fuel tank or an engine including the fuel tank.

14. The fuel cap of claim 11, further comprising:
a base connected to the valve and the spacer, wherein the valve extends from the base in a first direction and the spacer extends from the base in a second direction.

15. Fuel cap of claim 11, further comprising:
a valve member shaped in a disc and comprising the valve.

16. The fuel cap of claim 15, wherein the spacer is between the valve and an outer circumference of the valve member.

17. The fuel cap of claim 15, wherein the spacer is between an outer circumference of the valve member and a center of the valve member.

18. The fuel cap of claim 17, wherein the spacer includes a first ring outside of the valve in a direction of an outer circumference of the valve member.

19. The fuel cap of claim 18, wherein the spacer includes a second ring that overlaps the valve.

20. The fuel cap of claim 15, wherein the valve is a first valve, and the valve member includes a second valve configured to selectively control a flow air into the fuel tank.

* * * * *